United States Patent [19]
Beard

[11] Patent Number: 4,924,519
[45] Date of Patent: May 8, 1990

[54] FAST ACCESS DIGITAL AUDIO MESSAGE SYSTEM AND METHOD

[76] Inventor: Terry D. Beard, 1407 N. View Dr., Westlake Village, Calif. 91362

[21] Appl. No.: 41,346

[22] Filed: Apr. 22, 1987

[51] Int. Cl.$^5$ .............................................. G10L 5/02
[52] U.S. Cl. ...................................................... 381/51
[58] Field of Search ..................................... 381/51–53, 381/36–40; 364/513.5; 379/88–89

[56] References Cited

U.S. PATENT DOCUMENTS

| | | | |
|---|---|---|---|
| 3,398,241 | 8/1968 | Lee | 179/1 |
| 3,662,348 | 5/1972 | Weiss | 381/51 |
| 3,755,794 | 8/1973 | Stapleford | 340/173 R |
| 3,870,818 | 3/1975 | Barton et al. | 179/1 SM |
| 4,069,970 | 1/1978 | Buzzard et al. | 235/312 |
| 4,214,125 | 7/1980 | Mozer et al. | 179/1 SM |
| 4,307,859 | 12/1981 | Hayashi et al. | 246/124 |
| 4,335,277 | 6/1982 | Puri | 179/1 SM |
| 4,359,713 | 11/1982 | Tsunoda | 340/52 F |
| 4,359,714 | 11/1982 | Tsunoda et al. | 340/52 F |
| 4,420,813 | 12/1983 | Inoue et al. | 381/51 |
| 4,441,201 | 4/1984 | Henderson et al. | 381/51 |
| 4,458,110 | 7/1984 | Mozer | 381/52 |
| 4,623,970 | 11/1986 | Toyomura | 381/51 |
| 4,757,542 | 7/1988 | Neahr et al. | 381/51 |

Primary Examiner—Gary V. Harkcom
Assistant Examiner—John A. Merecki
Attorney, Agent, or Firm—Koppel & Jacobs

[57] ABSTRACT

Message storage capacity is provided on memory modules, the number of modules being expandable to increase the capacity of the system. Each module has digital memory which is organized with a plurality of message units, each message unit including a number of successive memory bytes for storing respective messages. A desired message is accessed by stepping through the message units to the desired location having the start of the desired meassage, skipping the intervening bytes. The message is then read out at the system clock rate. The memory of each module is preferably addressed by a corresponding counter which has a lower order control input for counting up at one memory byte per count, and a higher order control input for counting up at an accelerated rate of one message unit per count. A microprocessor controller causes each of the memory modules to access the location of the desired message through a fast access line, and then causes the desired message to be read out from its particular module while readout from the other modules is inhibited.

22 Claims, 3 Drawing Sheets

FAST ACCESS DIGITAL AUDIO MESSAGE SYSTEM AND METHOD

BACKGROUND OF THE INVENTION

1. Field of the Invention

This invention deals with systems for storing audio messages in digital form and then playing back the messages when desired, and more particularly to an audio message system and method in which a large number of separate messages are stored on one or more memory chips.

2. Description of the Prior Art

Pre-recorded audio messages for use on aircraft, elevators, etc. are presently stored in digital format by placing them in a large memory. Each different message has a unique memory address, and is called up when desired by means of a binary counter which addresses and steps through the memory. When many messages are stored, a very large address bus with many wires and a large access capacity is required. For example, for a one million byte memory, twenty separate binary address lines are required. This imposes a limitation on the message capacity, increases costs makes the system more complicated and requires time to locate and access any particular message.

SUMMARY OF THE INVENTION

In view of the above problems in the prior art, the object of the present invention is to provide a digital audio message storage system and method having a large memory capacity which can be expanded indefinitely without increasing the complexity of the basic system, has a greatly improved addressing system that requires many fewer separate address lines, accesses any desired message very quickly, and is relatively inexpensive.

The invention accomplishes these objects with a digital memory consisting of one or more separate memory units, preferably EPROMs (erasable programmable read only memory). Each memory unit is organized into a series of message units. Each message is stored in its own message units, with the unoccupied portion of the message unit following the message encoded to indicate that the message has ended. A desired message is accessed by stepping through the memory unit in increments of full message units until the desired message is reached, and then reading out the message byte-by-byte. In the preferred embodiment the system is operated under an 8,192 Hz clock, with each message unit containing 2,048 bytes of memory. The desired message is thus accessed by stepping through the memory in ¼ second memory increments, followed by reading out the message at the clock rate. Under computer control the fast access mechanism can step through the memory at a rate well in access of 100,000 message units per second.

These and other features and advantages of the invention will be apparent to those skilled in the art from the following detailed description of a preferred embodiment, taken together with the accompanying drawings, in which:

DETAILED DESCRIPTION OF A PREFERRED EMBODIMENT

Figure 1:
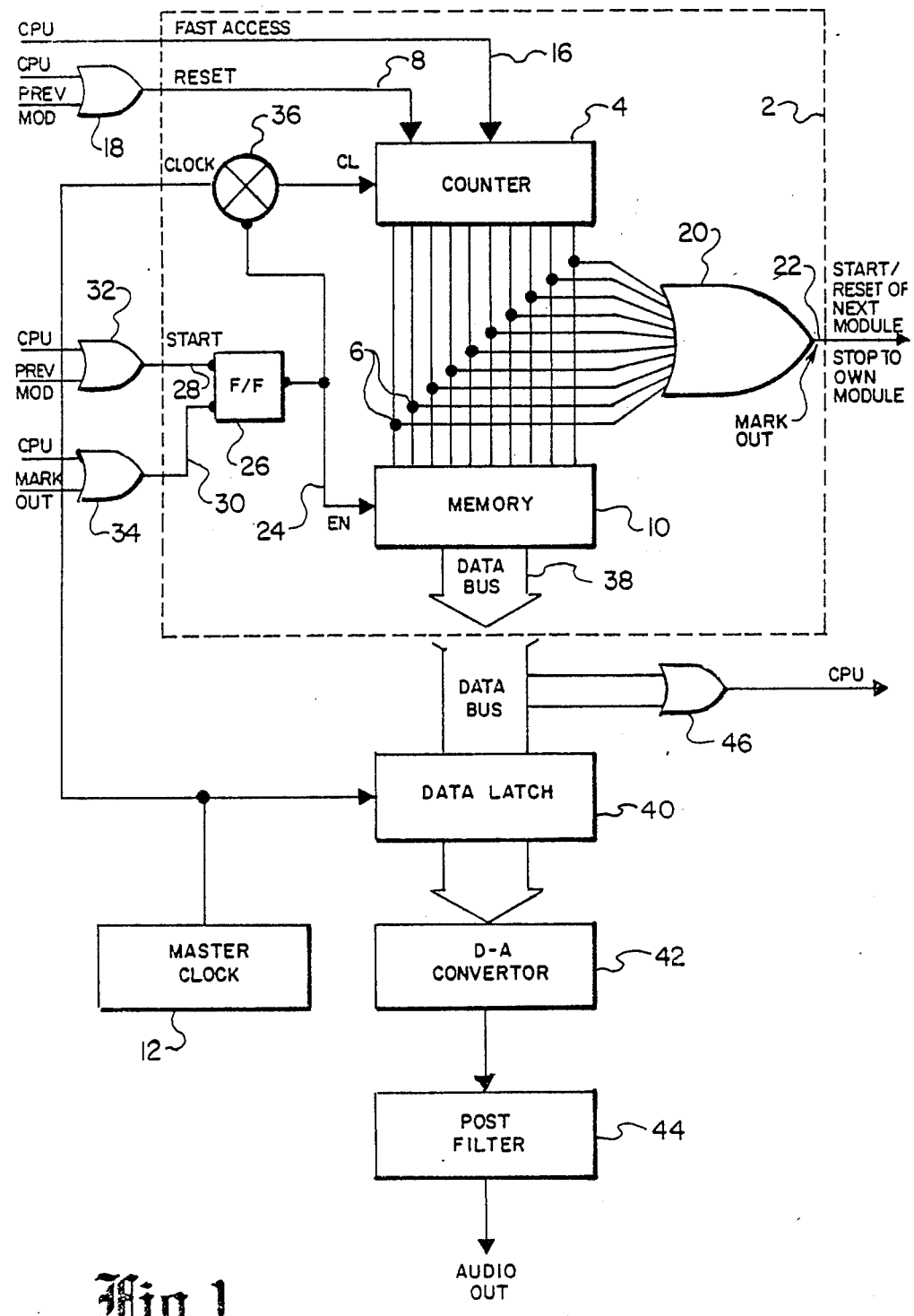
FIG. 1 is a block diagram of a digital message memory module in accordance with the invention.

FIG. 1 shows a memory module that is used to store digital audio messages, and to provide fast access for locating and reading out any desired message. As explained below, additional memory modules may be added to the system as desired to expand its message capability, without adding significantly to the complexity of the system. The system allows large amounts of digital memory to be accessed and used in a digital audio storage system with a minimum of control lines, but with high flexibility and expandability.

The individual module is contained within dashed line 2; the external elements are common to the various modules. Each module includes a counter 4 which steps through its memory by counting up in a binary fashion over output address lines 6. The counter has a reset input 8 which resets it to access the beginning of a digital memory 10, which is preferably an EPROM.

Counter 4 has two counting control inputs. The first is a clock input from master clock 12 through gate 36. The clock input is applied to the lowest order stage of counter 4, and causes the counter to advance by one for each clock pulse. The clock rate is preferably 8,192 pulses per second, causing the counter to count up at a corresponding rate.

A fast access line 16 is connected to a higher order counter stage. It receives a series of pulses, preferably from a microprocessor controller (not shown), and causes the counter to advance in large scale increments. For example, if the fast access input is connected to the twelfth counter stage, it will increment the counter by 2,048 for each fast access pulse. If the clock rate is 8,192 Hz, each fast access pulse will thus advance the counter by an amount equivalent to ¼ second of memory. The fast access pulses themselves can be generated at a very high rate, well in excess of 100 KHz, under the control of a computer.

The reset line 8 includes an OR gate 18 which can receive inputs from a microprocessor controller or from the previous memory module. The counter 4 resets whenever a signal is received from the microprocessor controller indicating that a new message is to be accessed, or in response to an appropriate signal from the previous module indicating that its capacity has been reached and counter 4 is now to take over.

A "mark out"·gate 20 is connected to the memory address lines 6 to detect the appearance of a predetermined memory address on the address lines. This is useful for detecting the arrival at a given point in memory. This information can be used for several different control functions. If a number of different memory modules are used in series, the presence of a signal on the output line 22 of gate 20 can be used to indicate that the end of the module's memory capacity has been reached, and to start and/or reset the next memory module. In this fashion any number of modules can be linked together in a simple series sequence. The gate output can also be used to reset the counter 4 from which it emanated. This can be done together with a stop signal applied to the counter, or without stopping the counter so that it continues to run and the memory 10 is repeatedly scanned in a loop operation.

Data is read out of the memory in response to its being addressed by counter 4 when an enable signal is present on enable input line 24. The control for this line is provided by a flip-flop circuit 26, which has start and stop inputs 28 and 30. OR gates 32 and 34 are connected respectively to start and stop lines 28 and 30. Start OR gate 32 can receive inputs from either a microprocessor controller or from the previous module, while stop OR gate 34 can receive inputs from a microprocessor controller or the mark output line 22. When a start signal is applied the flip-flop 26 provides an enable signal to the gate 36 in the clock input circuit, and also to the memory enable input 24. This permits the counter to start counting up under the clock input, and also permits the memory to be read out in response to signals on the address lines 6. A stop signal reverses the flip-flop state, removing the enable signals and preventing the clock signal from reaching the counter or the memory being read out.

The portion of the memory addressed by counter 4 is read out onto data bus 38, and is accumulated in a data latch 40. The data latch is operated in synchronism with the counter by an input from the clock 12, so that it outputs digital words to a digital-to-analog converter 42. The resulting analog signal is processed through a post filter 44 to provide the desired output audio signal. When multiple memory modules are used, an end detect gate 46 on the data bus is used to detect the end of a message. The end of each message is "tagged" by coding the immediately following memory bytes with an unallowed state, such as all zeros or all ones. The "end tag" is delivered to the microprocessor controller to indicate the end of the message has been reached.

Figure 2:
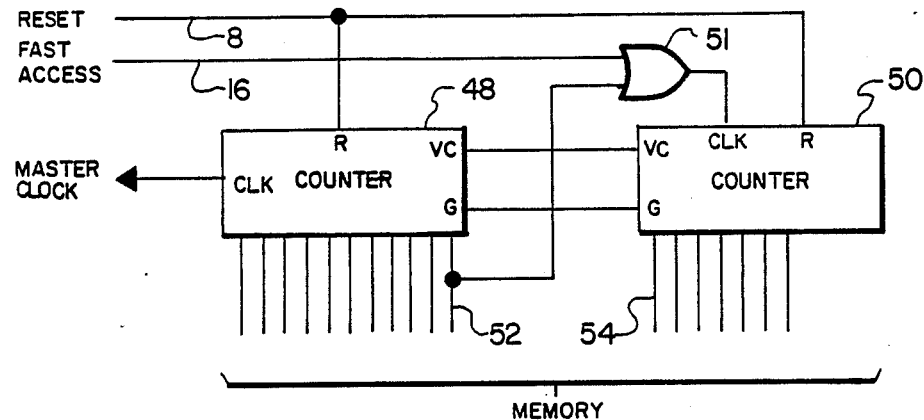
FIG. 2 is a block diagram of a counter employed in the memory module.

Referring now to FIG. 2, an implementation of the counter 4 is shown consisting of two counter stages 48 and 50. The first counter stage 48 has a clock input from the master clock, and is reset from reset line 8. Counter 50 serves as a higher order device. It receives a clock input from either the fast access line 16 or the last stage output of counter 48 by OR gate 51, and is reset in common with counter 48 from reset line 8. The two counter stages are tied together to produce one overall counter, with lower order counter stage 48 providing the less significant bits and higher order counter stage 50 providing the more significant bits. As illustrated, counter stage 48 has 11 output lines 52, while counter stage 50 has 7 output lines 54. These output lines are arranged in ascending binary order, such that the output from the first line will count as binary 1, from the second line as 2, from the third line as 4, etc. Thus, the last output line from counter stage 48 will have a binary value of 1,024, and the first output line from counter stage 50 will have a binary value of 2,048. Thus, for a clock rate of 8,192 Hz, each fast access pulse into higher order counter stage 50 will advance the binary output of the overall clock by a time equivalent of 2,048/8,192, or ¼ second. Counter stage 50 has 7 output lines which, together with the 11 lower order output lines from counter stage 48, provides addressing capability for 1 479 million samples of memory. To access up to 4,000,000 samples of memory, counter 50 would have 9 lines, and so on. Thus any size memory can be accessed.

Figure 3:
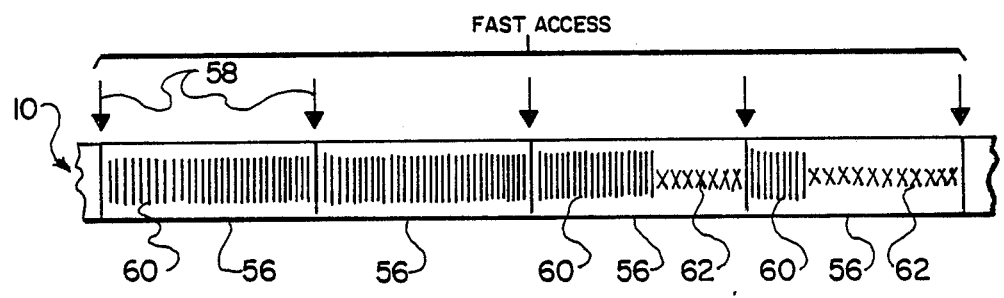
FIG. 3 is an illustration of a series of message units in memory.

The organization of each memory unit 10 is illustrated in FIG. 3. The memory is organized into a series of successive "message units" 56, each message unit including a number of memory bytes. With the embodiment shown in FIG. 2, in which each pulse on the fast access line increments the counter output by 2,048, each message unit would include 2,048 successive bytes. Thus, any desired message can be accessed very quickly by applying a number of fast access pulses corresponding to the location of the message. This causes the counter to rapidly count up message unit-by-message unit, skipping over the intervening memory bytes. The fast access entry points into memory are indicated by arrows 58, which correspond to the beginning of each successive message unit 56.

Once the fast access capability is used to address the desired message unit, the message contained therein is read out under the address control from the master clock. In the preferred embodiment this readout occurs at 2,048 bytes per second. Any particular message, indicated by vertical lines 60, begins at the beginning of a given message unit. The memory bytes following a message within a message unit are encoded with an end code, mentioned above, as indicated by x's 62.

Figure 4:
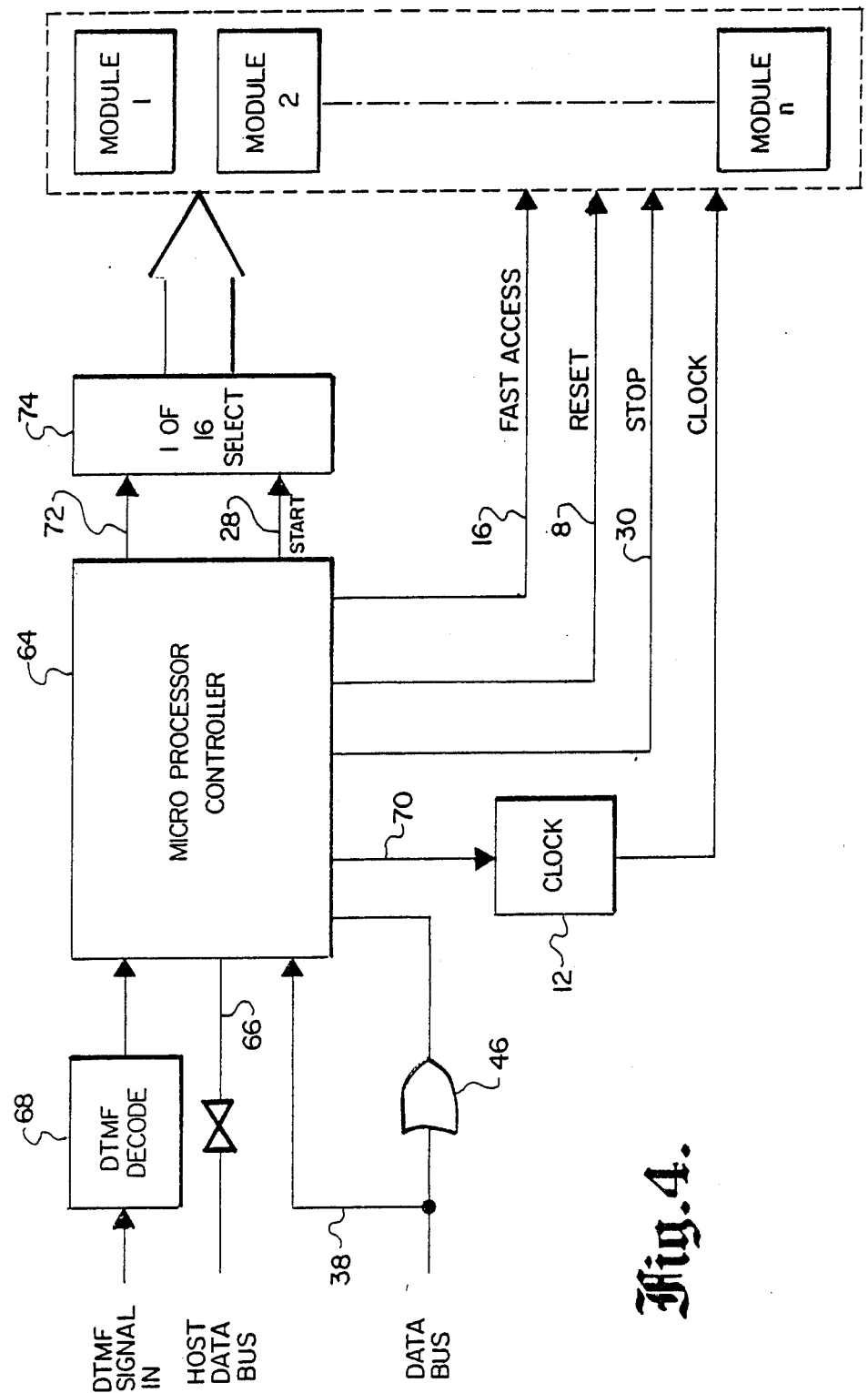
FIG. 4 is a block diagram of an expandable system which includes a number of memory modules.

A block diagram of a system which includes a plurality of memory modules controlled by a microprocessor controller 64 is provided in FIG. 4. Numerous suitable controllers are available, such as Zilog, Inc. Model Z80. The controller 64 can accept input either from a host computer via input bus 66, or in the form of dual tone multi-frequency (DTMF) signals through DTMF decoder 68. The microprocessor can also accept input from the system data bus 38. The end detect gate 46, described above, is used to detect the end of a message on the data bus and in response to issue an output to the controller 64. The controller at that point issues a stop command to the various memory modules via stop line 30.

The controller also provides an output to clock enable line 70 which allows it to stop the clock 12 from sending clock pulses to the system, thereby effecting a pause. The controller can reset the memory modules via reset line 8, or issue fast access pulses over fast access line 16. The clock out, stop, reset and fast access signals are applied in common to each of the memory modules.

The microprocessor controller 64 has stored in its memory the start location of each message stored in the various memory modules, and issues the required number of fast access pulses over line 16 to access the beginning of any requested message. The controller issues a start command to the particular memory module containing the start of the desired message over line 72, which is connected to a select chip 74. In the illustrative example the system includes 16 separate memory modules, so a 4-bit code is provided from the controller to a one of 16 select chip 74. The select chip routes the start pulse to the proper module, while the remaining modules remain inhibited.

The controller 64 may also have the ability to store a series of messages to be played in sequence by storing the sequence in its internal memory. When the end of each message is detected by gate 46, the next message in the message stack is automatically accessed and played. The controller may also have stored in its memory the data that is supposed to be located at specific locations in the memory modules; by checking this data against what is actually stored in the system memory, faults may be detected and the location of the faults determined.

The communication bus 66 allows the controller to communicate with a host computer, thereby enabling it to act as an announce system for the computer. Bus 66 is a unidirectional port which allows the controller to inform the host computer of its current operating state.

Figure 5:
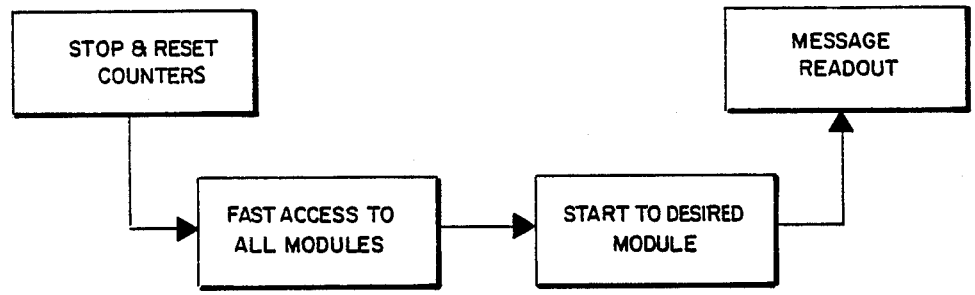
FIG. 5 is a flow diagram of the message acquisition method employed with the system of FIG. 4.

FIG. 5 is a flow diagram which summarizes the system operation. The counters in the various memory modules are first stopped and reset. Fast access pulses are simultaneously applied to all of the modules via a common fast access line, causing them to step through the message units of their respective memories until the desired message location is reached. A start signal is then routed to the particular module containing the desired message, causing the message to be read out byte-by-byte at the clock rate while readout from the other memory units remains inhibited. If the selected message continues over from the selected module to the next module, the first unit stops itself when it reaches its end mark and resets and starts the next module to continue the message.

The described system eliminates the need for the large number of control lines required by prior large memory systems. Only START, STOP, RESET, FAST ACCESS and CLOCK control lines are required, no matter how many additional memory modules are added. The capacity of the system can thus be expanded indefinitely.

While a particular embodiment of the invention has been shown and described, it should be understood that numerous variations and alternate embodiments will occur to those skilled in the art. Accordingly, it is intended that the invention be limited only in terms of the appended claims.

I claim:

1. A fast access digital audio message system, comprising:
    a digital memory having a plurality of memory bytes for storing digital audio message signals, the digital memory being organized into a plurality of sequential message units, each message unit including a plurality of sequentially ordered bytes for storing digital audio messages, said messages being stored in mutually exclusive message units in respective continuous sequences of memory bytes, the first memory byte for each stored message being located at substantially the same location within its respective memory unit as the location of the first memory bytes for the other stored messages within their respective message units,
    means for accessing the memory by stepping through the message units in multi-byte steps to a desired message unit, skipping the memory bytes between said multi-byte steps, said accessing means comprising a counter addressing the memory, means for producing and applying to the counter a lower order control input causing the counter to count up at a rate corresponding to one memory byte per count, and means for producing and applying to the counter a higher order control input causing the counter to count up at an accelerated rate of one message unit per count, the counter addressing a memory message unit in the memory in accordance with its higher order control input, the counter further addressing the memory bytes within the message unit in accordance with its lower order control input for reading out the message stored therein, and
    means for reading out the message at the desired message unit.

2. The system of claim 1, said accessing means further comprising means for inhibiting the lower order control input to the counter until said higher order control input has been applied to the counter.

3. The system of claim 1, further comprising means for detecting when the reading out of the digital audio message at the desired message unit has been completed.

4. The system of claim 1, said digital memory comprising a plurality of serially connected memory modules, further comprising means for detecting when the end of a memory module has been reached during the reading out of a message stored therein.

5. The system of claim 1, wherein said message units include equal numbers of memory bytes.

6. The system of claim 1, wherein the memory stores the digital audio messages with the first byte of the messages stored at the first memory byte location of their respective message units.

7. The system of claim 1, wherein said memory is organized into message units which are a whole binary number multiple of 2,048 memory bytes in length.

8. The system of claim 1, further comprising means for inhibiting the application of said lower order control input to said counter until an accessed message is being read out from the memory.

9. A high capacity, fast access digital audio message system, comprising:
    (a) a plurality of message modules, each module comprising:
        (1) a digital memory having a plurality of memory bytes for storing digital audio message signals, the digital memory being organized into a plurality of sequential message units, each message unit including a plurality of sequentially ordered bytes for storing digital audio messages, said messages being stored in mutually exclusive message units in respective continuous sequences of memory bytes, the first memory byte for each stored message being located at substantially the same location within its respective memory unit as the location of the first memory byte for the other stored messages within their respective message units, and
        (2) means for accessing the memory by stepping through the message units in multi-byte steps to a desired message unit, skipping the memory bytes between said multi-byte steps, said memory accessing means comprising a counter addressing said digital memory, means for producing and applying to the counter a lower order control input causing the counter to count up at a rate corresponding to one memory byte per count, and means for producing and applying to the counter a higher order control input causing the counter to count up at an accelerated rate of one message unit per count, the counter addressing a memory message unit in the memory in accordance with its higher order control input, and addressing the memory bytes within the message unit in accordance with its lower order control input for reading out the message stored therein,
    (b) a data bus connected to the message modules to receive therefrom a message stored in a desired message unit, (c) means for actuating a single desired message module at a time to deliver therefrom a message stored in a desired message unit to the data bus, and (d) means for reading out from the data bus the message so delivered.

10. The system of claim 9, further comprising means for detecting when the end of a memory module has been reached during the reading out of a message stored therein, and for actuating another module in response thereto.

11. The system of claim 9, wherein said accessing means concurrently accesses the memory byte location within each module which corresponds to the location of said desired message unit, and said actuating means actuates delivery of the desired message from the memory module in which it is stored, and inhibits the delivery of messages from the corresponding memory locations in the other modules.

12. The system of claim 8, said accessing means further comprising means for inhibiting the lower order control input to the counter until said higher order control input has been applied to the counter.

13. The system of claim 8, wherein the digital memories of said message modules have substantially equal memory capacities.

14. The system of claim 8, wherein said data bus includes means for connecting to additional memory modules.

15. The system of claim 8, said readout means comprising a data latch connected to receive and accumulate digital data from the data bus, and a digital-to-analog converter connected to convert digital data held by the latch to an analog format.

16. The system of claim 8, wherein each memory stores digital audio messages with the first byte of the messages stored at the first memory byte location of their respective message units.

17. A fast access digital audio message system, comprising:

a digital memory having a plurality of memory bytes for storing digital audio message signals, the digital memory being organized into a plurality of sequential message units, each message unit including a plurality of sequentially ordered bytes for storing digital audio messages, said messages being stored in mutually exclusive message units in respective continuous sequences of memory bytes, the first memory byte for each stored message being located at substantially the same location within its respective memory unit as the location of the first memory byte for the other stored messages within their respective message units, a counter addressing the memory, means for producing and applying to the counter a lower order control input causing the counter to count up at a rate corresponding to one memory byte per count, and means for producing and applying to the counter a higher order control input causing the counter to count up at an accelerated rate of one message unit per count, the counter addressing a memory message unit in the memory in accordance with its higher order control input, the counter further addressing the memory bytes within the message unit in accordance with its lower order control input, a gate controlling the application of said lower order control input signal to the counter, a clock connected to provide said lower order control input to the gate in the form of a clock signal, a switch control connected to enable the gate to pass said clock signal to the counter in response to said higher order control signal accessing the counter, and to disable the gate at other times, means for resetting the counter after addressing the memory, a data latch connected to receive and accumulate digital data from the addressed portion of the memory, and a digital-to-analog converter connected to convert the digital data in the latch to an audio analog format.

18. The system of claim 17, said counter comprising first and second counters connected in series so that the second counter is advanced each time the first counter has counted up a predetermined amount, the first counter counting less significant bits and the second counter counting more significant bits, said lower and higher order control inputs being provided respectively to the first and second counters.

19. The system of claim 17, said switch control being connected to enable the memory to provide data to the data latch when the gate is enabled.

20. The system of claim 19, said switch control comprising a flip-flop switch which is controllable by a microprocessor controller.

21. The system of claim 17, wherein the counter addresses the memory via a plurality of memory address lines, said memory having a predetermined memory capacity, and further comprising means connected to said address lines for detecting when the counter has reached the end of the memory capacity.

22. The system of claim 17, wherein the memory stores digital audio messages with messages stored at the first memory byte location of their respective message units.

* * * * *